US011142082B2

(12) United States Patent
Chang et al.

(10) Patent No.: US 11,142,082 B2
(45) Date of Patent: Oct. 12, 2021

(54) LINEAR TRANSMISSION DEVICE WITH CAPABILITY OF WIRELESS POWER SUPPLY

(71) Applicant: HIWIN TECHNOLOGIES CORP., Taichung (TW)

(72) Inventors: Keng-Ming Chang, Taichung (TW); Yu-Wei Chuang, Taichung (TW); Meng-Ying Lin, Taichung (TW); Chun-Yen Wu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 82 days.

(21) Appl. No.: 16/535,037

(22) Filed: Aug. 7, 2019

(65) Prior Publication Data
US 2021/0039512 A1    Feb. 11, 2021

(51) Int. Cl.
*B60L 53/122*    (2019.01)
*B60L 13/03*    (2006.01)
*H02J 50/10*    (2016.01)
*H02K 41/02*    (2006.01)

(52) U.S. Cl.
CPC .............. *B60L 53/122* (2019.02); *B60L 13/03* (2013.01); *H02J 50/10* (2016.02); *H02K 41/02* (2013.01)

(58) Field of Classification Search
CPC ....... B60L 53/122; B60L 13/03; H02K 41/02; H02J 50/10
USPC .......................................... 307/104; 320/108
See application file for complete search history.

(56) References Cited

U.S. PATENT DOCUMENTS

| 3,525,005 A | 8/1970 | Beyers | |
|---|---|---|---|
| 3,693,033 A | 9/1972 | Troesh | |
| 5,737,211 A * | 4/1998 | Hirai | H01F 38/14 363/144 |
| 10,317,963 B1 * | 6/2019 | DeVaul | G06F 1/26 |
| 2002/0057164 A1 * | 5/2002 | Jin | H01F 38/14 336/115 |
| 2010/0253089 A1 | 10/2010 | Huang | |
| 2012/0189146 A1 * | 7/2012 | Wuidart | H04R 25/554 381/312 |

(Continued)

FOREIGN PATENT DOCUMENTS

| CN | 101171147 A | 4/2008 |
|---|---|---|
| CN | 107026517 A | 8/2017 |
| CN | 207603394 U | 7/2018 |

(Continued)

*Primary Examiner* — Hal Kaplan
*Assistant Examiner* — Thai H Tran
(74) *Attorney, Agent, or Firm* — Winston Hsu (57) ABSTRACT

A linear transmission device with capability of wireless power supply includes a transmission mechanism and a wireless power supply module. The transmission mechanism includes a long shaft part and a moving part. The long shaft part defines an axis. The moving part is disposed on the long shaft part in a manner that the moving part is movable along the axis. The wireless power supply module includes a magnet-providing part disposed on the long shaft part for providing a magnetic field and an induction coil disposed on the moving part. A direction of the magnetic field is parallel to the axis. A normal vector of the induction coil is parallel to the direction of the magnetic field. When the moving part is moved along the axis, a current is induced in the induction coil through variation of the magnetic field.

7 Claims, 9 Drawing Sheets

(56) References Cited

U.S. PATENT DOCUMENTS

2013/0038278 A1\* 2/2013 Park .................... H04B 5/0075
                                                              320/108
2013/0220756 A1\* 8/2013 Jindo ................... F16C 29/008
                                                              191/10

FOREIGN PATENT DOCUMENTS

| CN | 109120073 A | 1/2019 |
| DE | 101 25 059 A1 | 12/2002 |
| JP | 4975640 B2 | 7/2012 |
| JP | 2017-96836 A | 6/2017 |
| TW | 201404657 A | 2/2014 |

\* cited by examiner

LINEAR TRANSMISSION DEVICE WITH CAPABILITY OF WIRELESS POWER SUPPLY

BACKGROUND OF THE INVENTION

1. Field of the Invention

The present disclosure relates to a linear transmission device, and more particularly, to a linear transmission device with capability of wireless power supply.

2. Description of the Prior Art

A linear transmission device, such as a linear guideway, a ball screw and a ball spline, plays an important role in automation equipment. For enhancing stability of automation equipment, the linear transmission device is developing toward intelligent field. Through installing sensors on the linear transmission device, parameters of the linear transmission device can be collected and monitored, and corresponding treatment can be made according to the parameters to avoid failure. For example, the rigid parameters can be monitored to know wear conditions of components so as to replace the components before the components are damaged. As another example, vibration parameters can be monitored to control operating speeds of components so as to avoid components getting stuck due to an excessive operating speed.

A cable may be adapted to supply power to the sensors installed on a moving part of the linear transmission device. The aforesaid solution to power supply of the sensors may result in difficulty in adding the cable in the existing circuit layout for automation equipment (such as injection molding machine) with complex and dense circuit layout. Furthermore, the cable tends to be pulled during the moving process of the moving part, which causes drawbacks, such as fatigue, breakage or leakage of the cable. Accordingly, it is unfavorable for monitoring the linear transmission device.

Chinese patent publication No. 101326706A (hereinafter CN101326706A) discloses a wireless actuator, the wireless actuator supplies power to a load (such as a drive component and a radio receiver portion) disposed on a movable table through a non-contact power supply component. The non-contact power supply component includes a primary coil disposed on a base and a secondary coil disposed on the movable table. The primary coil is provided with an alternating current so as to generate a magnetic field, and a direction of the magnetic field is perpendicular to a longitudinal direction of the track. Through variation of the direction of the magnetic field of the primary coil, a current is induced in the secondary coil. As such, the non-contact power supply component can supply power to the load disposed on the movable table through a wireless method, and the drawback that cables tend to be pulled during the moving process of the movable table can be prevented. However, due to the arrangement of the primary coil and the secondary coil, the region where disposed the primary coil is required to cover the displacement distance of the movable table along the longitudinal direction of the track (for example, it requires to dispose a plurality of primary coils along the longitudinal direction of the track, so that a total length of the plurality of primary coils is greater than or equal to the displacement distance of the movable table along the longitudinal direction of the track; alternatively, a single primary coil with large size is disposed along the longitudinal direction of the track, such that a length of the primary coil is greater than or equal to the displacement distance of the movable table along the longitudinal direction of the track). As such, when the movable table moves along the base, the secondary coil can be opposite to at least one primary coil. If the region where disposed the primary coil is desired to be reduced, it requires to provide a secondary battery to connect with the secondary coil, such that power can be supplied to the secondary coil through the secondary battery when the secondary coil is far away from the primary coil. Accordingly, the wireless actuator requires more materials, which inevitably increases production cost and manufacturing difficulty.

Chinese patent publication No. 103659791A (hereinafter CN103659791A) discloses a wireless power transmission apparatus and direct drive type system including the apparatus. Chinese patent No. 102931735B (hereinafter CN102931735B) discloses a non-contact power supply system and method for mobile device moving along track. However, the arrangements of the primary coil and secondary coil of CN103659791A and CN102931735B are similar to that of CN101326706A, and thus also have drawbacks of higher production cost and manufacturing difficulty.

Thus, development of a new linear transmission device capable of supplying power to a load disposed on a moving part in a wireless manner is favorably applied in the automation equipment (such as injection molding machine) with complex and dense circuit layout, prevents drawbacks of wired method for supplying power, such as fatigue, breakage or leakage of cables, reduces production cost and manufacturing difficulty and has become an important goal for the relevant industry.

SUMMARY OF THE INVENTION

According to an embodiment of the present disclosure, a linear transmission device with capability of wireless power supply includes a transmission mechanism and a wireless power supply module. The transmission mechanism includes a long shaft part and a moving part. The long shaft part defines an axis. The moving part is disposed on the long shaft part in a manner that the moving part is movable along the axis. The wireless power supply module includes a magnet-providing part and an induction coil. The magnet-providing part is disposed on the long shaft part for providing a magnetic field, and a direction of the magnetic field is parallel to the axis. The induction coil is disposed on the moving part, and a normal vector of the induction coil is parallel to the direction of the magnetic field. When the moving part is moved along the axis, a current is induced in the induction coil through variation of the magnetic field.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
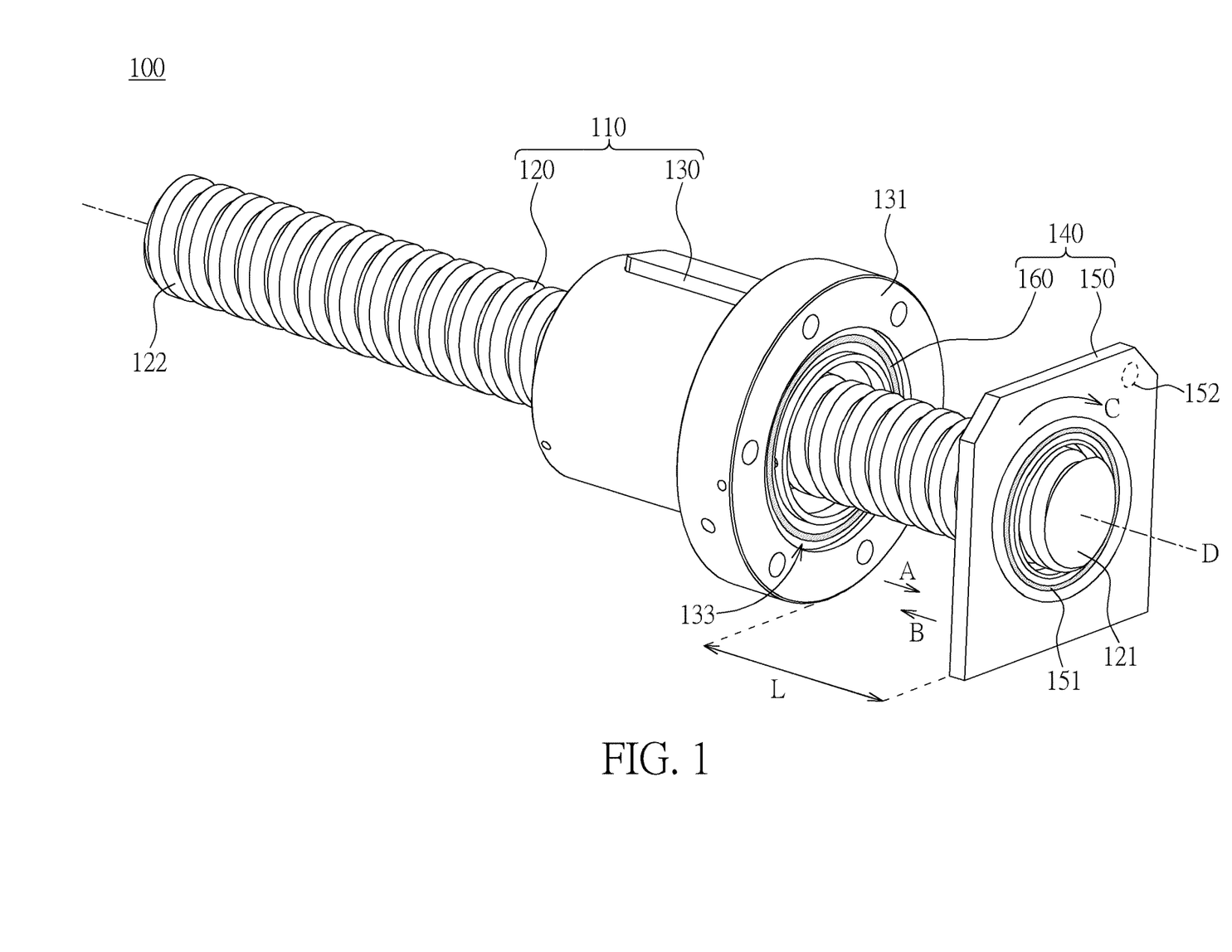
FIG. 1 is a three-dimensional diagram showing a linear transmission device according to one embodiment of the present disclosure.

Please refer to FIG. 1, which is a three-dimensional diagram showing a linear transmission device 100 according to one embodiment of the present disclosure. The linear transmission device 100 is capable of supplying power in a wireless manner. The linear transmission device 100 includes a transmission mechanism 110 and a wireless power supply module 140. The transmission mechanism 110 includes a long shaft part 120 and a moving part 130. The long shaft part 120 defines an axis D. The moving part 130 is disposed on the long shaft part 120 in a manner that the moving part 130 is movable along the axis D. In the embodiment, the long shaft part 120 is a screw shaft, the moving part 130 is a nut, and at least one rolling element (not shown), such as a ball or a roller can be disposed between the screw shaft and the nut. In other words, the transmission mechanism 110 can be a ball screw or a roller screw. In other embodiment, the transmission mechanism 110 can be, but is not limited to, a linear guideway or a ball spline. For example, when the transmission mechanism 110 is the linear guideway, the long shaft part 120 can be a sliding rail, and the moving part 130 can be a sliding block; when the transmission mechanism 110 is the ball spline, the long shaft part 120 can be a spline shaft, and the moving part 130 can be a spline nut.

The wireless power supply module 140 includes a magnet-providing part 150 and an induction coil 160. The magnet-providing part 150 is disposed on the long shaft part 120 for providing a magnetic field, and a direction B of the magnetic field is parallel to the axis D. Specifically, the magnet-providing part 150 includes a coil 151, the coil 151 is arranged to be parallel to the induction coil 160. The coil 151 can be connected to a power source (not shown) through a cable (not shown) so as to be powered to generate the magnetic field. When the coil 151 is provided with a clockwise current, the direction of the current is shown as the arrow direction C, a side of the magnet-providing part 150 facing toward the moving part 130 is a north pole, and a side of the magnet-providing part 150 away from the moving part 130 is a south pole. That is, the direction B of the magnetic field of the magnet-providing part 150 orients toward the moving part 130 and is parallel to the axis D. When the coil 151 is provided with a counterclockwise current (the direction of the current is contrary to the arrow direction C), the side of the magnet-providing part 150 facing toward the moving part 130 is a south pole, and the side of the magnet-providing part 150 away from the moving part 130 is a north pole. That is, the direction B of the magnetic field of the magnet-providing part 150 orients away from the moving part 130 and is parallel to the axis D. In other embodiment, the magnet-providing part can be a permanent magnet, and a direction of the magnetic field of the permanent magnet can be orient toward or away from the moving part and is parallel to the axis D.

The induction coil 160 is disposed on the moving part 130. A normal vector A of the induction coil 160 is parallel to the direction B of the magnetic field. When the moving part 130 is moved along the axis D, a current is induced in the induction coil 160 through variation of the magnetic field. Hereinafter, the current induced in the induction coil 160 can also be called induced current. In the embodiment, the coil 151 of the magnet-providing part 150 is arranged to be parallel to the induction coil 160. As such, the magnetic flux passing through the induction coil 160 can be enhanced, such that the efficiency for generating the induced current can be enhanced.

The variation of the magnetic field can be achieved by changing the magnetic flux passing through the induction coil 160 which is caused by the relative movement between the induction coil 160 and the magnet-providing part 150. When the magnet-providing part 150 includes the coil 151, the variation of the magnetic field can also be achieved by changing the direction B of the magnetic field of the magnet-providing part 150 by providing the coil 151 of the magnet-providing part 150 with an alternating current. Furthermore, the wire diameter, the coil diameter and the number of the turns of the induction coil 160 can be adjusted to increase the intensity of the induced current.

In FIG. 1, the magnet-providing part 150 is disposed at an end portion 121 of the long shaft part 120. As such, it can avoid affecting the original stroke of the moving part 130.

In FIG. 1, the moving part 130 includes an end surface 131 and a groove 133. The groove 133 is concavely formed on the end surface 131, and the induction coil 160 is disposed in the groove 133. As such, the original size of the moving part 130 can be maintained, which can avoid affecting the original stroke of the moving part 130.

In FIG. 1, the wireless power supply module 140 can selectively include a distance sensor 152 disposed on the side of the magnet-providing part 150 facing toward the moving part 130. For showing the position of the distance sensor 152, the distance sensor 152 is depicted with dashed line. The distance sensor 152 is for sensing a distance L between the magnet-providing part 150 and the induction coil 160. When the distance L between the magnet-providing part 150 and the induction coil 160 is a predetermined distance, the coil 151 of the magnet-providing part 150 is supplied with power to provide the magnetic field. As such, the magnet-providing part 150 can only be supplied with power within the range of predetermined distance, which is favorable for saving electric energy and thermal energy. The predetermined distance can be greater than 0 cm and less than or equal to 30 cm. The distance sensor 152 can be, but is not limited to, an optical sensor (such as laser radar) or ultrasonic sensor.

Figure 2:
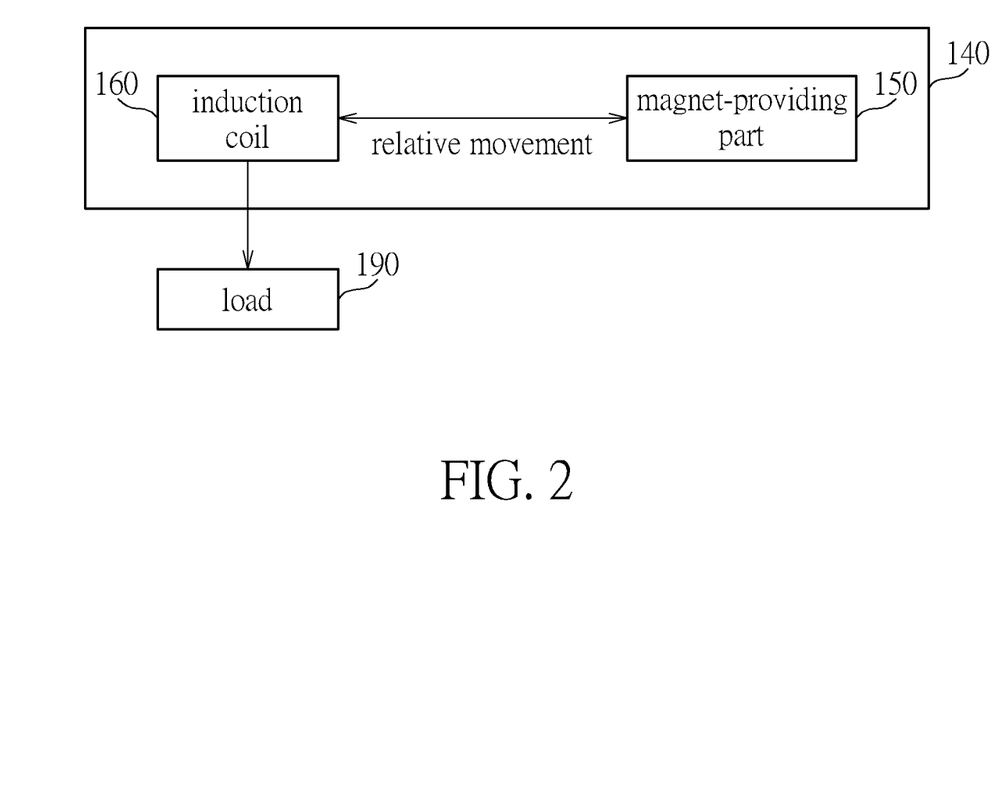
FIG. 2 is a functional block diagram showing a wireless power supply module of FIG. 1 supplying power to a load.

Please refer to FIG. 2, which is a functional block diagram showing the wireless power supply module 140 of FIG. 1 supplying power to a load 190. Specifically, the induction coil 160 can be electrically connected to the load 190. As such, the current induced in the induction coil 160 can be provided to the load 190 directly.

Figure 3:
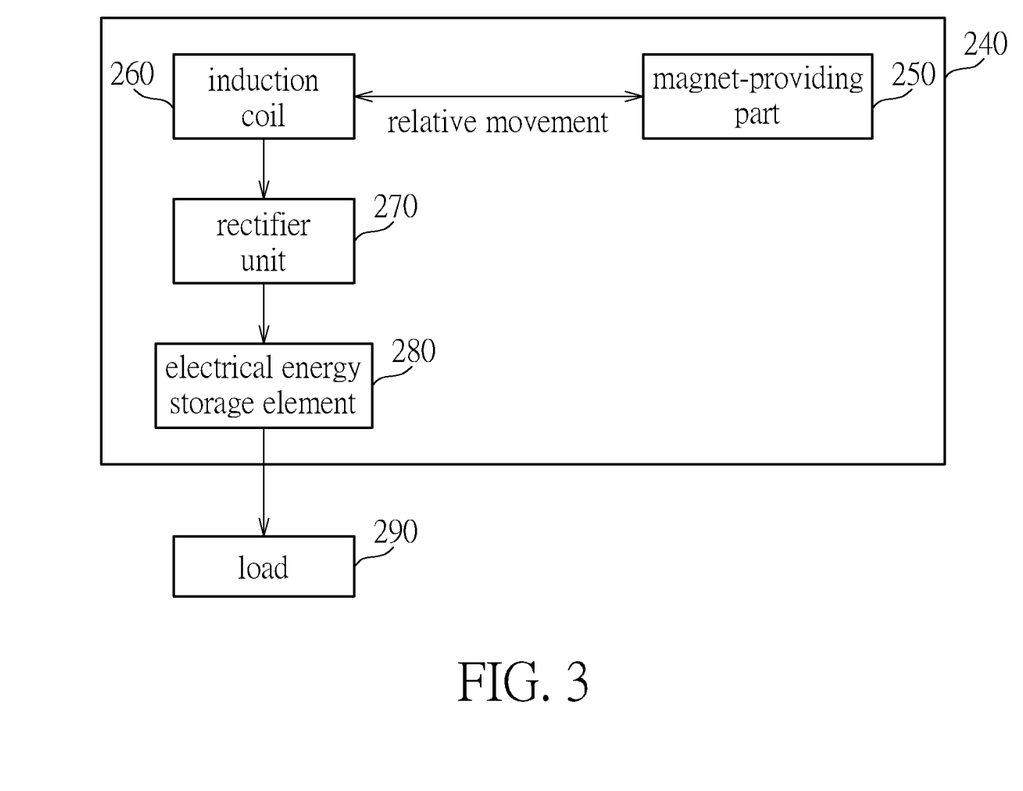
FIG. 3 is a functional block diagram showing a wireless power supply module supplying power to a load according to another embodiment of the present disclosure.

Please refer to FIG. 3, which is a functional block diagram showing a wireless power supply module 240 supplying power to a load 290 according to another embodiment of the present disclosure. The wireless power supply module 240 includes a magnet-providing part 250, an induction coil 260, a rectifier unit 270 and an electrical energy storage element 280. The rectifier unit 270 is disposed between the induction coil 260 and the electrical energy storage element 280 for converting the induced current from an alternating current to a direct current. The electrical energy storage element 280 is disposed on the moving part and is electrically connected to the induction coil 260 through the rectifier unit 270. The electrical energy storage element 280 can be disposed on the moving part in a detachable manner. As such, it is favorable for replacing the energy storage element 280. The electrical energy storage element 280 can be, but is not limited to, a capacitance or a rechargeable battery. The rechargeable battery can be, but is not limited to, a button type rechargeable battery or a flexible lithium battery. The electrical energy storage element 280 can be electrically connected to the load 290. The current induced in the induction coil 260 can be firstly stored in the electrical energy storage element 280, then the electrical energy storage element 280 supplies power to the load 290. As such, it is favorable for supplying power to the load 290 continuously. For example, the magnet-providing part 250 is supplied with power only when the distance between the magnet-providing part 250 and the induction coil 260 is the predetermined distance. When the distance between the magnet-providing part 250 and the induction coil 260 is not the predetermined distance, the load 290 can be continuously supplied with power through the electrical energy storage element 280.

Other details of the wireless power supply module 240 can be identical to that of the wireless power supply module 140 when no contradiction is found, and are not repeated herein.

Figure 4:
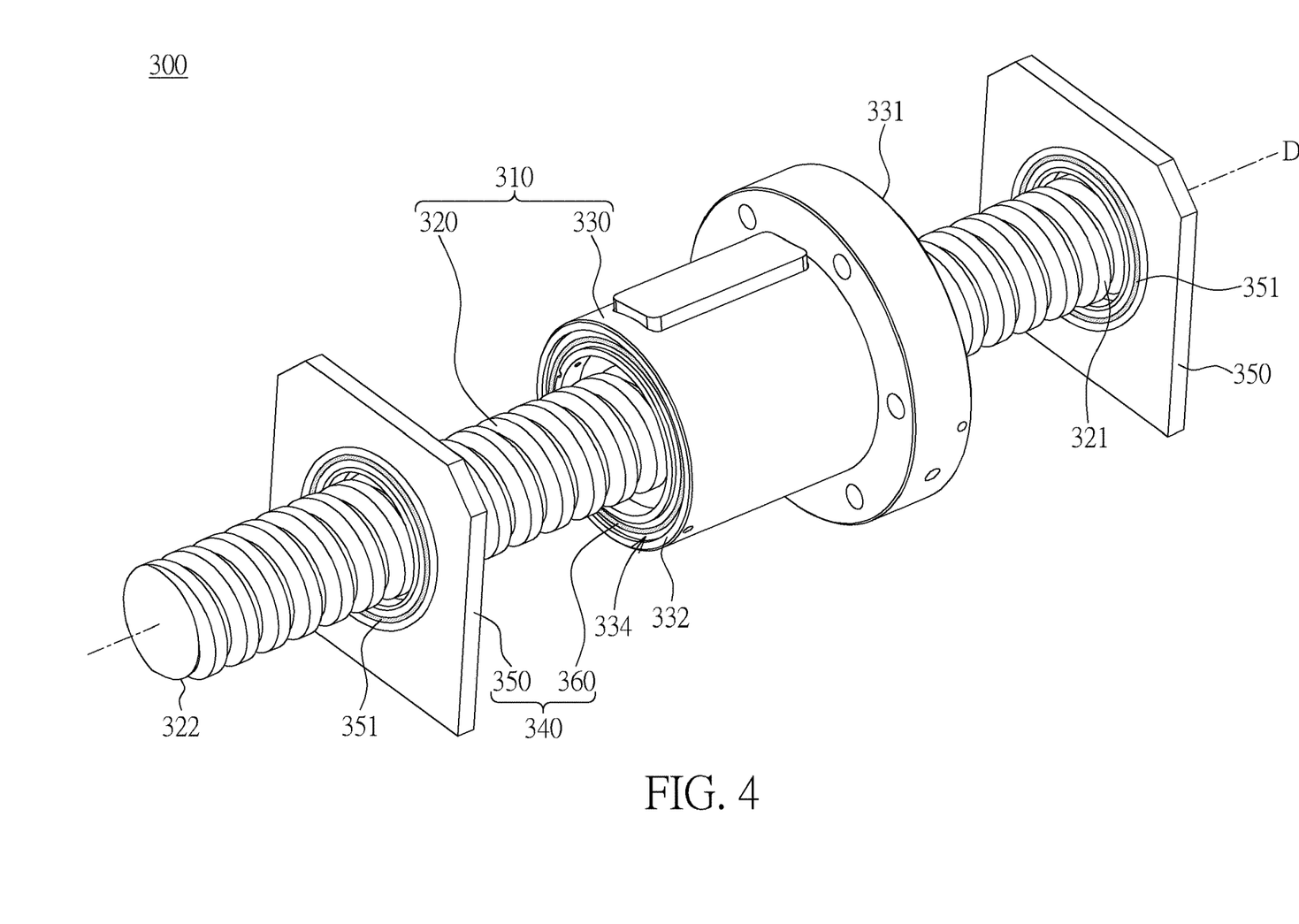
FIG. 4 is a three-dimensional diagram showing a linear transmission device according to yet another embodiment of the present disclosure.

FIG. 4 is a three-dimensional diagram showing a linear transmission device 300 according to yet another embodiment of the present disclosure. The linear transmission device 300 includes a transmission mechanism 310 and a wireless power supply module 340. The transmission mechanism 310 includes a long shaft part 320 and a moving part 330. The wireless power supply module 340 includes two magnet-providing parts 350 and two induction coils 360 (only one induction coil 360 is shown). The two magnet-providing parts 350 are disposed at two end portions 321 and 322 of the long shaft part 320, respectively. Each of the magnet-providing part 350 includes a coil 351. The moving part 330 includes two end surfaces 331 and 332 and two grooves, wherein one groove (not shown) is concaved from the end surface 331, and the other groove 334 is concaved from the end surface 332. The two induction coils 360 are disposed in the groove of the end surface 331 and the groove 334 of the end surface 332, respectively. The coils 351 are arranged to be parallel to the induction coils 360. The coil 351 can be connected to a power source (not shown) through a cable (not shown) so as to be powered to generate a magnetic field.

In FIG. 4, the two induction coils 360 can be electrically connected to an identical load (not shown). As such, the currents induced in the two induction coils 360 can be supplied to the identical load. Alternatively, the two induction coils 360 can be electrically connected to two loads (not shown), respectively. That is, the currents induced in the two induction coils 360 are supplied to the two loads, respectively. When the two induction coils 360 are electrically connected to the identical load, the two induction coils 360 can be arranged in series or in parallel. How to arrange the direction of the magnetic field of the two magnet-providing parts 350 to correspond to the arrangement (series connection or parallel connection) of the two induction coils 360 is well known in the art, and is not recited herein.

Other details of the linear transmission device 300 can be identical to that of the linear transmission device 100 when no contradiction is found, and are not repeated herein.

Figure 5:
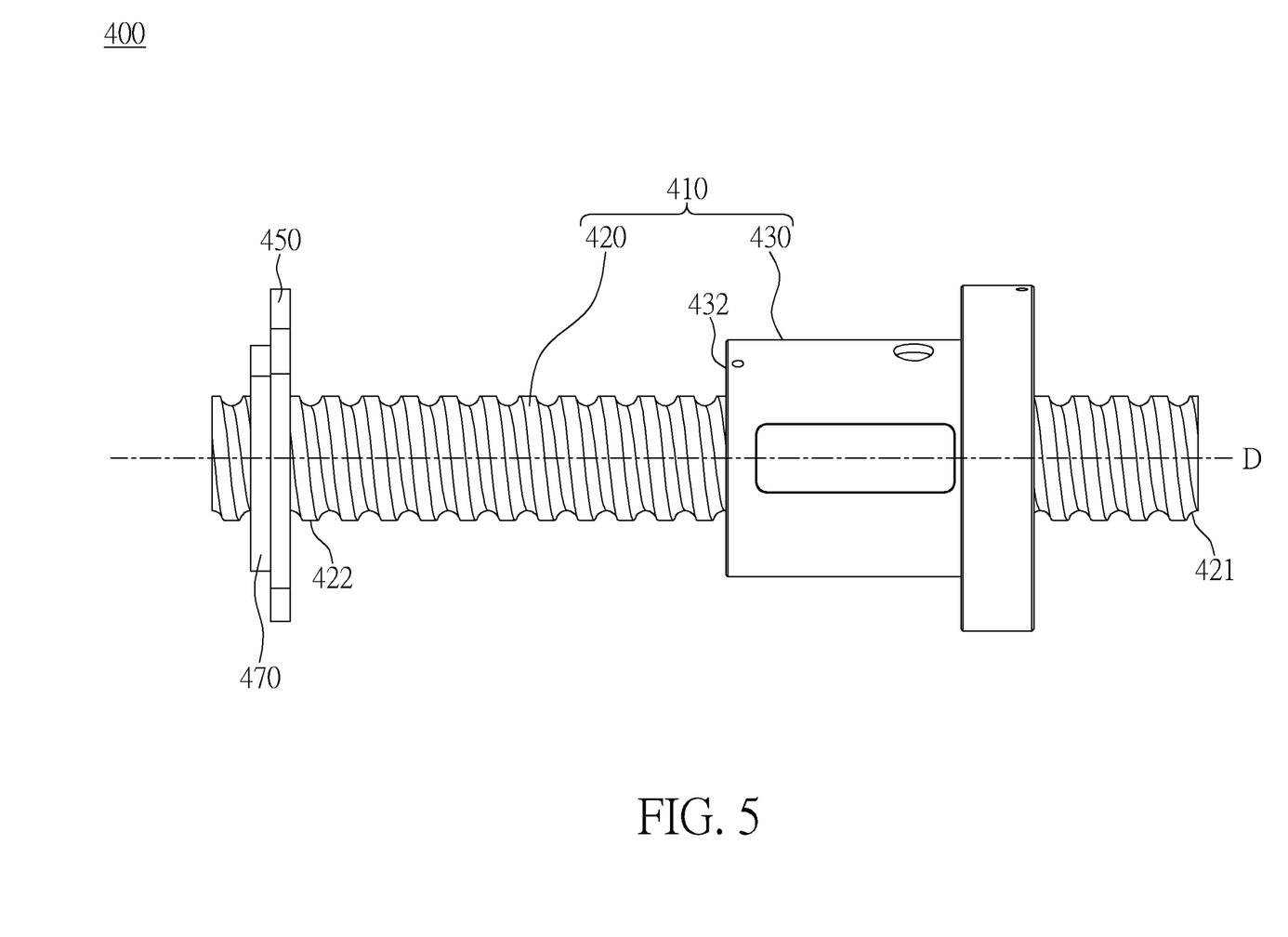
FIG. 5 is a plan diagram showing a linear transmission device according to yet another embodiment of the present disclosure.

FIG. 5 is a plan diagram showing a linear transmission device 400 according to yet another embodiment of the present disclosure. The linear transmission device 400 includes a transmission mechanism 410 and a wireless power supply module (not labelled). The transmission mechanism 410 includes a long shaft part 420 and a moving part 430. The long shaft part 420 includes two end portions 421 and 422. The moving part 430 includes an end surface 432 and a groove (not shown). The groove is concaved from the end surface 432. The wireless power supply module includes a magnet-providing part 450 and an induction coil (not shown). The induction coil is disposed in the groove of the end surface 432. The magnet-providing part 450 is disposed at the end portion 422 of the long shaft part 420. The wireless power supply module can further include a supporting part 470. The supporting part 470 is for supporting the magnet-providing part 450. The magnet-providing part 450 can be fixed to the supporting part 470 by adhesive bonding or screwing. The supporting part 470 is disposed at the end portion 422 and is connected to a machine (not shown). A distance between the magnet-providing part 450 and the induction coil can be adjusted by using the supporting parts 470 with different thickness. Accordingly, the intensity of the induced current can be adjusted.

Figure 6:
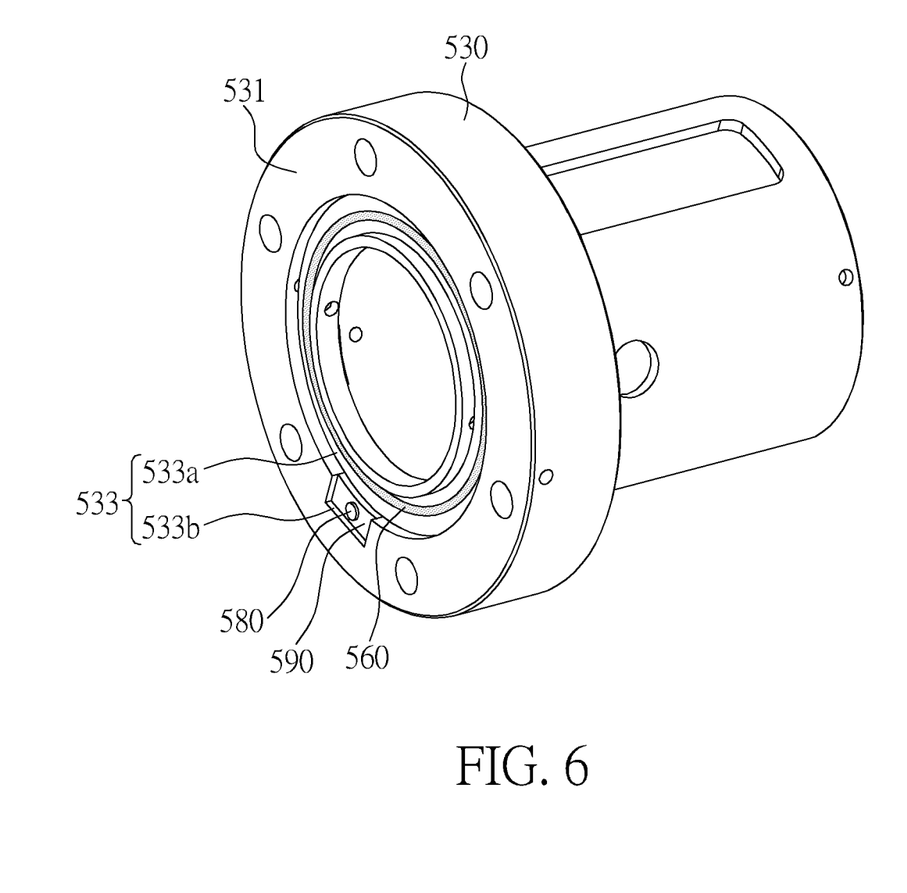
FIG. 6 is a three-dimensional diagram showing a moving part according to yet another embodiment of the present disclosure.

FIG. 6 is a three-dimensional diagram showing a moving part 530 according to yet another embodiment of the present disclosure. The linear transmission device can include a parameter sensing module 590. The parameter sensing module 590 can be electrically connected to the induction coil 560, i.e., the parameter sensing module 590 is a load connected to the induction coil 560. The parameter sensing module 590 is for sensing a parameter of the linear transmission device. For example, the parameter sensing module 590 can sense the operating speed of the long shaft part of the linear transmission device, which can avoid the situation that the long shaft part is stuck due to the damage of other elements caused by an excessive operating speed. The parameters sensed by the parameter sensing module 590 can be wirelessly transmitted to a receiving unit (not shown), such as a computer or a smart phone. As such, the linear transmission device can be monitored in real time. The parameter sensing module 590 can be, but is not limited to a sensor for sensing parameter of vibration, temperature, or sound signal.

In FIG. 6, the wireless power supply module can include an electrical energy storage element 580. The electrical energy storage element 580 is electrically connected to the induction coil 560. A rectifier unit (not shown) can be disposed between the electrical energy storage element 580 and the induction coil 560. The current induced in the induction coil 560 can be firstly stored in the electrical energy storage element 580, then the electrical energy storage element 580 supplies power to the parameter sensing module 590. In other words, the parameter sensing module 590 is electrically connected to the induction coil 560 through the electrical energy storage element 580.

The moving part 530 includes an end surface 531 and a groove 533. The groove 533 is concavely formed on the end surface 531. The groove 533 includes a first accommodating space 533a and a second accommodating space 533b. The induction coil 560 is disposed in the first accommodating space 533a. The electrical energy storage element 580 and the parameter sensing module 590 are disposed in the second accommodating space 533b. As such, it is favorable for maintaining the original size of the moving part 530.

Figure 7:
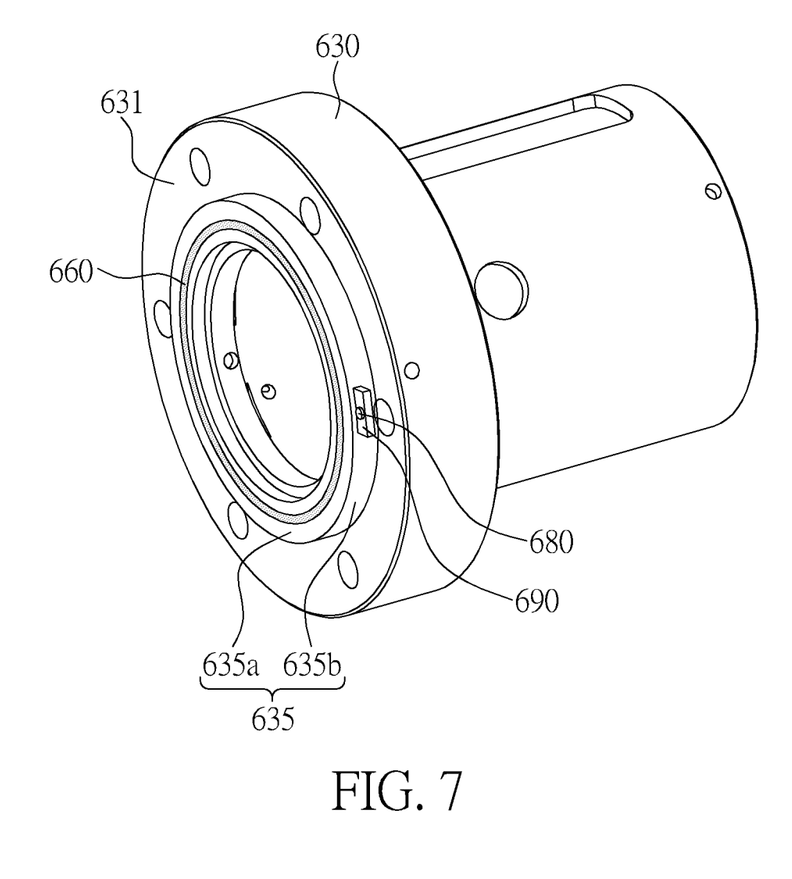
FIG. 7 is a three-dimensional diagram showing a moving part according to yet another embodiment of the present disclosure.

FIG. 7 is a three-dimensional diagram showing a moving part 630 according to yet another embodiment of the present disclosure. Comparing to FIG. 6, the moving part 630 includes an end surface 631 and a protruding portion 635. The protruding portion 635 protrudes from the end surface 631. The protruding portion 635 includes two surfaces, which are a top surface 635a and a side surface 635b, respectively. The side surface 635b connects the top surface 635a to the end surface 631. The induction coil 660 is disposed on the top surface 635a. The electrical energy storage element 680 and the parameter sensing module 690 are disposed on the side surface 635b. As such, it is favorable for maintaining the radial size of the moving part 630. In other embodiment, the induction coil 660 can be disposed on the side surface 635b, and the electrical energy storage element 680 and the parameter sensing module 690 can be disposed on the induction coil 660. Details of the electrical energy storage element 680 and the parameter sensing module 690 can refer to the electrical energy storage element 280, the electrical energy storage element 580 and the parameter sensing module 590, and are not repeated herein.

Figure 8:
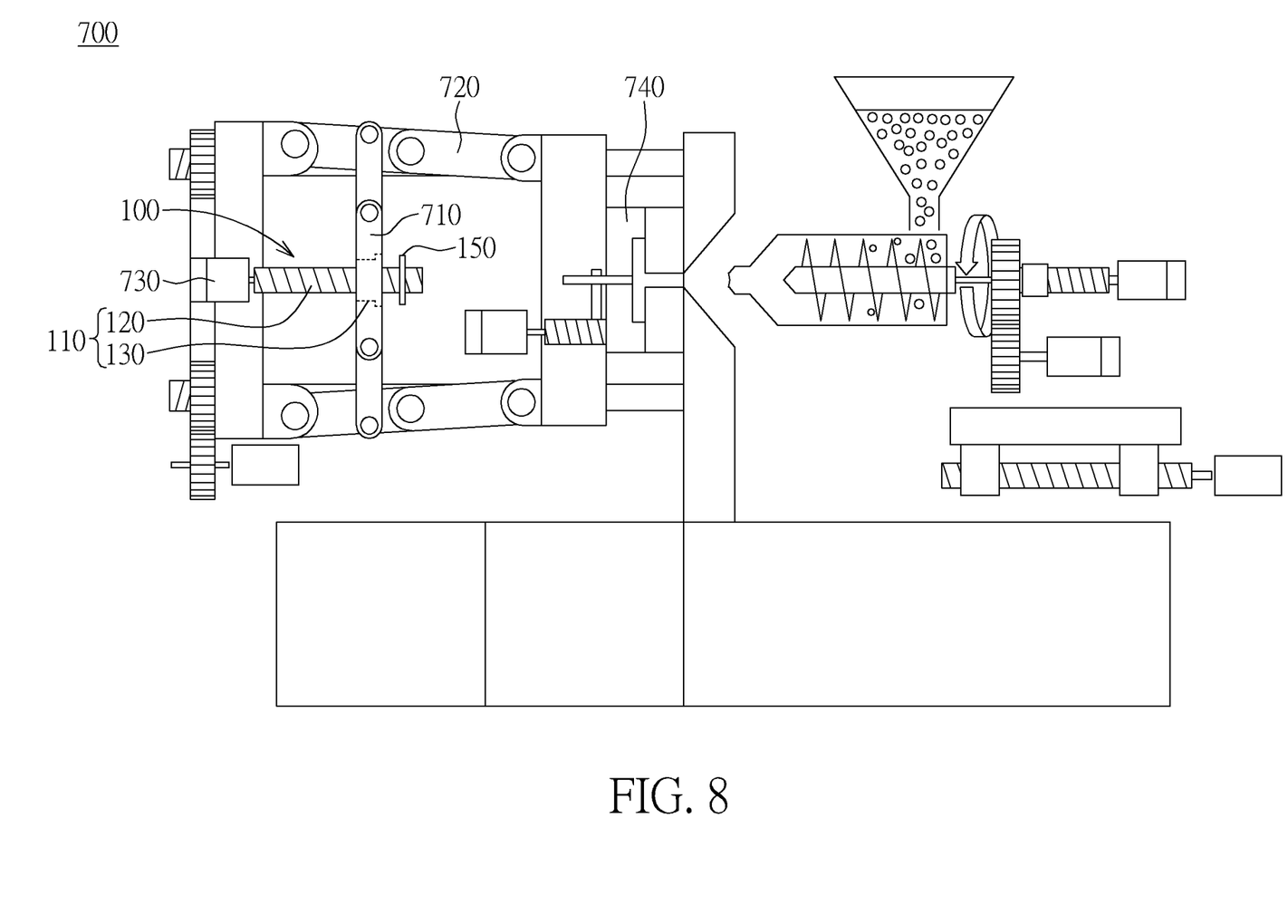
FIG. 8 is a plan diagram showing a machine according to yet another embodiment of the present disclosure.
Figure 9:
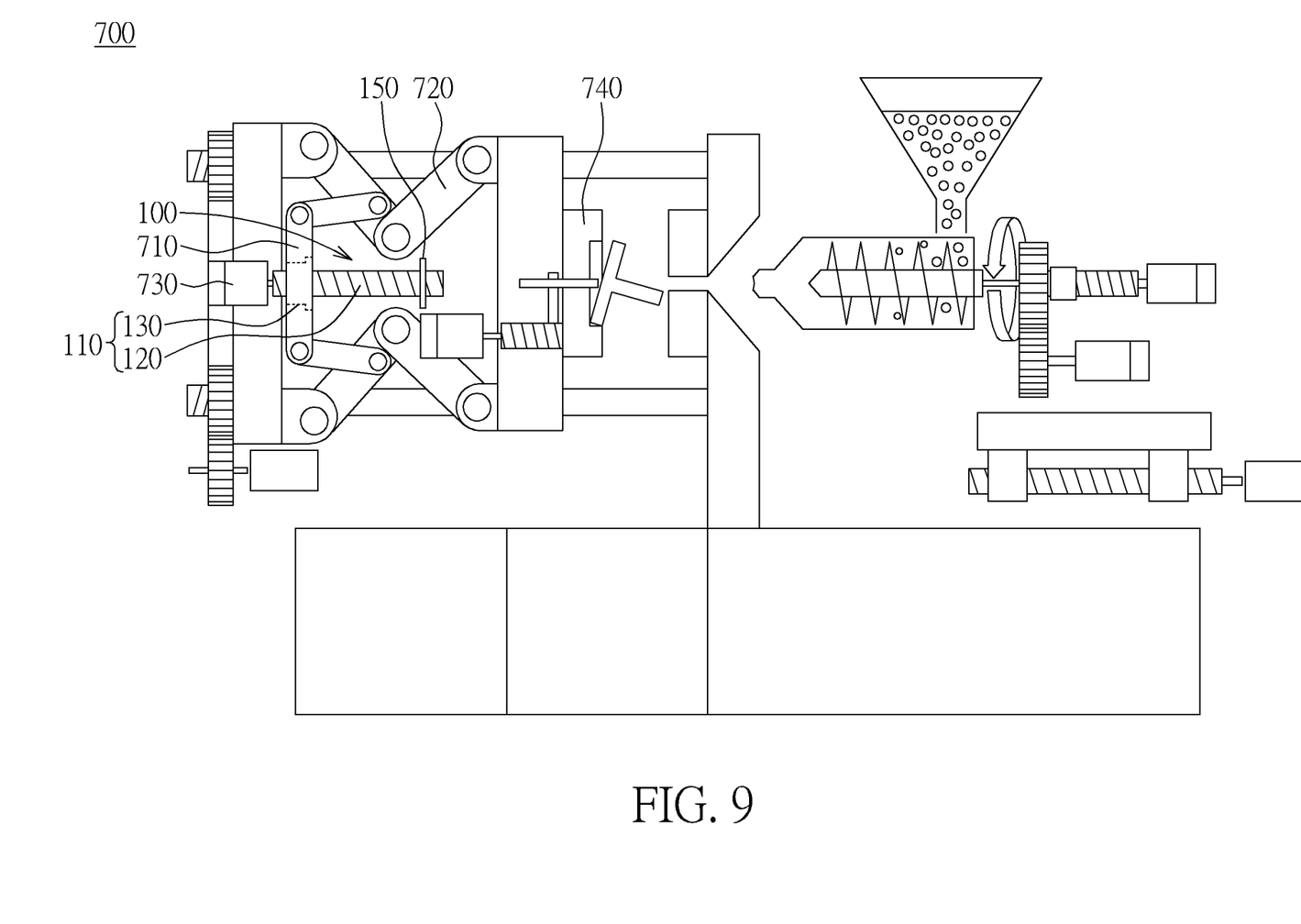
FIG. 9 is another plan diagram showing the machine of FIG. 8.

Please refer to FIG. 8 and FIG. 9, FIG. 8 is a plan diagram showing a machine 700 according to yet another embodiment of the present disclosure. FIG. 9 is another plan diagram showing the machine 700 of FIG. 8. In FIG. 8 and FIG. 9, the machine 700 is an injection molding machine. In FIG. 8, the machine 700 is in a clamping stage. In FIG. 9, the machine 700 is in an open and ejection stage. The linear transmission device 100 is disposed in the machine 700, and the machine 700 has a regular working stroke. Herein, the machine 700 being the injection molding machine is only exemplary, and the present disclosure is not limited thereto. The machine 700 which has a regular working stroke is suitable for disposing the linear transmission device 100. For example, the machine 700 can also be a die casting machine or a pipe-bending machine.

Please refer to FIG. 1 simultaneously, the linear transmission device 100 is connected to a driving motor 730 of the machine 700 through the end portion 122, and is connected to a first linkage 710 of the machine 700 through the moving part 130. The driving motor 730 drives the long shaft part 120 to rotate so as to drive the moving part 130 to move along the axis D, such that the first linkage 710 and the second linkage 720 are actuated to bring the mold 740 to repeat clamping and opening. With combining the wireless power supply module 140 to the transmission mechanism 110, the existing regular working stroke of the machine 700 can be used to generate relative movement between the magnet-providing part 150 and the induction coil 160 so as to induce the current in the induction coil 160. As such, extra power source is not required to generate the relative movement between the magnet-providing part 150 and the induction coil 160, which is favorable for providing the capability of wireless power supply while saving energy and simplifying elements. Furthermore, when the machine 700 has complex and dense circuit layout, it is difficult to add cables in the existing circuit layout for supplying power to the load disposed on the moving part 130 through a wired method. According to the present disclosure, the induced current of the induction coil 160 disposed on the moving part 130 can be generated by a wireless method, which can solve the difficulty of adding cables of the wired method.

According to the present disclosure, the term "parallel" or "perpendicular" refers that an element is configured to be parallel or perpendicular relative to another element. However, due to manufacturing tolerance or other factors, the element is not perfectly perpendicular relative to the other element. Therefore, in the present disclosure, the term "parallel" or "perpendicular" covers the meaning of the phrase "substantially parallel" or "substantially perpendicular". For example, a deviation of an desired angle between two elements ranges from −10 degrees to 10 degrees is within the scope of the present disclosure.

According to the present disclosure, the phrase "electrically connected" refers that two elements can transmit electrical energy through a direct, indirect, wired or wireless method.

Compared to the prior art, the wireless power supply module of the linear transmission device of the present disclosure can induce current in the induction coil disposed on the moving part in a wireless manner so as to supply power to a load (such as parameter sensing module) electrically connected to the induction coil, be favorably applied in the automation equipment (such as injection molding machine) with complex and dense circuit layout, prevent drawbacks of wired method for supplying power, such as fatigue, breakage or leakage of cables, and thus is favorable for the development of the linear transmission device in the intelligent field. Furthermore, according to the linear transmission device of the present disclosure, no matter the electrical energy storage element is provided or not, the region where the magnet-providing part is disposed is not required to cover the displacement distance of the moving part along the long shaft part, which is favorable for reducing production cost and manufacturing difficulty.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linear transmission device with capability of wireless power supply, comprising:
    a transmission mechanism, comprising:
        a long shaft part defining an axis; and
        a moving part disposed on the long shaft part in a manner that the moving part is movable along the axis; and
    a wireless power supply module, comprising:
        a magnet-providing part disposed on the long shaft part for providing a magnetic field, a direction of the magnetic field being parallel to the axis; and
        an induction coil disposed on the moving part, a normal vector of the induction coil being parallel to the direction of the magnetic field;
    wherein the moving part is a nut, the long shaft part is a screw shaft, the moving part comprises an end surface and a groove, the groove is concavely formed on the end surface, and the induction coil is disposed in the groove;
    wherein the magnet-providing part is disposed at an end portion of the long shaft part, and the magnet-providing part comprises a coil surrounding the screw shaft;
    wherein when the moving part is moved along the axis, a current is induced in the induction coil through variation of the magnetic field.

2. The linear transmission device of claim 1, wherein the linear transmission device is disposed in a machine, and the machine has a regular working stroke.

3. The linear transmission device of claim 1, wherein the wireless power supply module further comprises:
an electrical energy storage element disposed on the moving part and electrically connected to the induction coil.

4. The linear transmission device of claim 3, wherein the electrical energy storage element is disposed on the moving part in a detachable manner.

5. The linear transmission device of claim 1, wherein the wireless power supply module further comprises a distance sensor for sensing a distance between the magnet-providing part and the induction coil, when the distance between the magnet-providing part and the induction coil is a predetermined distance, the coil of the magnet-providing part is supplied with power to provide the magnetic field, the predetermined distance is greater than 0 cm and less than or equal to 30 cm.

6. The linear transmission device of claim 1, further comprising a parameter sensing module electrically connected to the induction coil, the parameter sensing module is for sensing a parameter of the linear transmission device.

7. A linear transmission device with capability of wireless power supply, comprising:
a transmission mechanism, comprising:
a long shaft part defining an axis; and
a moving part disposed on the long shaft part in a manner that the moving part is movable along the axis; and
a wireless power supply module, comprising:
a magnet-providing part disposed on the long shaft part for providing a magnetic field, a direction of the magnetic field being parallel to the axis; and
an induction coil disposed on the moving part, a normal vector of the induction coil being parallel to the direction of the magnetic field;
wherein the moving part is a nut, the long shaft part is a screw shaft, the moving part comprises an end surface and a protruding portion, the protruding portion protrudes from the end surface, and the induction coil is disposed on a surface of the protruding portion;
wherein the magnet-providing part is disposed at an end portion of the long shaft part, and the magnet-providing part comprises a coil surrounding the screw shaft;
wherein when the moving part is moved along the axis, a current is induced in the induction coil through variation of the magnetic field.

* * * * *